(12) United States Patent
McLaughlin

(10) Patent No.: US 6,851,665 B2
(45) Date of Patent: Feb. 8, 2005

(54) AIR SPRING HEAT SINK

(75) Inventor: Phillip M. McLaughlin, Mount Vernon, WA (US)

(73) Assignee: PACCAR Inc, Bellevue, WA (US)

( * ) Notice: Subject to any disclaimer, the term of this patent is extended or adjusted under 35 U.S.C. 154(b) by 1 day.

(21) Appl. No.: 10/307,246

(22) Filed: Nov. 27, 2002

(65) Prior Publication Data

US 2004/0100005 A1 May 27, 2004

(51) Int. Cl.$^7$ ................................................. F16F 9/04
(52) U.S. Cl. ............................... 267/64.27; 267/64.19; 267/64.23
(58) Field of Search ......................... 267/64.23, 64.24, 267/64.27, 64.21, 64.19

(56) References Cited

U.S. PATENT DOCUMENTS

| | | | |
|---|---|---|---|
| 3,687,440 A | | 8/1972 | Jarret et al. |
| 4,504,044 A | | 3/1985 | Shtarkman |
| 4,509,730 A | * | 4/1985 | Shtarkman ............... 267/64.27 |
| 4,518,513 A | | 5/1985 | Lochner et al. |
| 4,787,606 A | | 11/1988 | Geno et al. |
| 5,601,164 A | | 2/1997 | Ohsaki et al. |
| 5,738,936 A | | 4/1998 | Hanrahan |
| 6,237,333 B1 | | 5/2001 | Lee et al. |
| 6,345,813 B1 | | 2/2002 | Trowbridge |

OTHER PUBLICATIONS

"Low Gamma Gas,Heat Sink, and Pneumatic Damping" SAE HS 1576 Pneumatic Spring Manual, 1988, Chap 5 pp. 4.24–4.27.*

"Low Gamma Gas, Heat Sink, and Pneumatic Damping," *SAE HS–1576 Pneumatic Spring Manual*, 1988, Chap. 5 pp. 4.24–4.27.

Gieck, J., "Riding on Air: A History of Air Suspension," *Society of Automotive Engineers, Inc.*, Warrendale, PA, 1999, pp. 221–222.

* cited by examiner

*Primary Examiner*—Robert A. Siconolfi
(74) *Attorney, Agent, or Firm*—Christensen O'Connor Johnson Kindness PLLC

(57) ABSTRACT

A method and apparatus for reducing the spring rate of an air spring is disclosed by providing a heat sink within the working chamber of the air spring. The heat sink, in effect, reduces the ratio of specific heats, gamma, of the spring medium, e.g. air, located within the air spring, which in turn, reduces the spring rate. In one embodiment, the heat sink is a plurality of polymeric or elastomeric fibers configured as a stable fiber, commonly referred to fiber fill. The fibers used for the heat sink may include longitudinally extending bores to increase the exposed surface to weight ratio of the fiber, and/or may have a friction reducing coating that resists matting and provides airiness to the fibers. In an example provided herein, the heat sink dramatically reduced the spring rate of the air spring, especially at an operational frequency over one (1) hertz.

15 Claims, 3 Drawing Sheets

AIR SPRING HEAT SINK

FIELD OF THE INVENTION

The present invention relates to air springs, and more particularly, to a method and apparatus for reducing the spring rate of an air spring.

BACKGROUND OF THE INVENTION

Pneumatic springs, commonly referred to as air springs, have been used in motor vehicles for a number of years to provide cushioning between movable parts in the vehicle. Air springs absorb shock loads impressed on the vehicle axles by the wheels striking an object in the road or falling into a depression. An air spring typically consists of a flexible rubber sleeve also known as a bellows or a bladder. The sleeve contains a supply of compressed gas and has one or more pistons located therein or thereunder. An end cap closes off the upper region of the sleeve. During use, the piston moves axially toward and away from the end cap so as to alternatingly compress and expand the internal volume within the sleeve. In this manner, the air spring acts as an energy absorbing means for the vehicle, with operating characteristics determined by the spring rate of the air spring.

It is commonly known that vibration isolation, occupant ride quality, and cargo protection can be improved by reducing a vehicle suspension's dynamic spring rate. As is known in the art, one method of reducing the spring rate of an air spring is to increase the interior volume of the sleeve. Although increasing the internal volume of the sleeve may reduce the spring rate of an air spring, increasing the interior volume of the air spring is not suitable for many applications. For instance, in applications where the space for mounting the air spring is limited, increasing the interior volume of the air spring may prevent proper installation of the air spring, or worse, may prevent the use of the specifically designed air spring.

Further known in the art, a reduction of the spring rate of an air spring may be achieved by the use of alternative gases within the interior volume of the air spring. For example, the ratio of heat capacities, sometimes referred to as the ratio of specific heats and denoted by the Greek letter "gamma," varies with the molecular size of the gas. Accordingly, selecting a gas with a lower gamma coefficient than air will provide an air spring with a reduced spring rate without increasing its interior volume. However, these alternative gases contain more complicated molecules, such as sulfur hexafluoride with a gamma of 1.09, that often pose problems, such as high costs, lack of availability, toxicity, and system compatibility.

Therefore, there is a need in the heavy truck industry for a method and apparatus for reducing the spring rate of an air spring that is incorporated in a suspension of a heavy truck.

SUMMARY OF THE INVENTION

A method and apparatus for reducing the spring rate of an air spring by incorporating a heat sink within the working chamber of the air spring. By utilizing the heat sink to reduce the spring rate of the air spring, the use of alternative gases or increasing the internal volume of the air spring and their respective deficiencies are avoided.

In accordance with an aspect of the present invention, an air spring of a vehicle suspension operating at frequencies greater than 1 hertz is provided. The air spring includes first and second end members adapted to be mounted at spaced apart locations; a flexible sleeve having first and second open ends sealingly engaged with the first and second end members, respectively, thereby forming a main gas chamber within the sleeve for containing a pressurized gas; and a heat sink occupying a portion of the working chamber. The heat sink is configured to transfer heat between the pressurized gas and the heat sink, thereby reducing the spring rate of the air spring.

In accordance with another aspect of the present invention, a method for reducing the spring rate of an air spring having an operational frequency greater than 1 hertz is provided. An air spring is obtained that defines a working chamber for containing a pressurized gaseous medium. A heat sink is then disposed within the working chamber of the air spring. The heat sink is operable to exchange heat between the spring medium of the air spring.

In accordance with yet another aspect of the present invention, a method of using an air spring having a working chamber occupied by a spring medium is provided. The method comprises disposing a heat sink within the working chamber of the air spring, wherein the heat sink is operable to transfer heat to and receive heat from the spring medium of the air spring. The air spring is then operated at frequencies greater than 1 hertz by alternatingly compressing and expanding the air spring. During the operation of the air spring, the spring rate of the air spring is reduced by the heat transfer between the spring medium and the heat sink.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
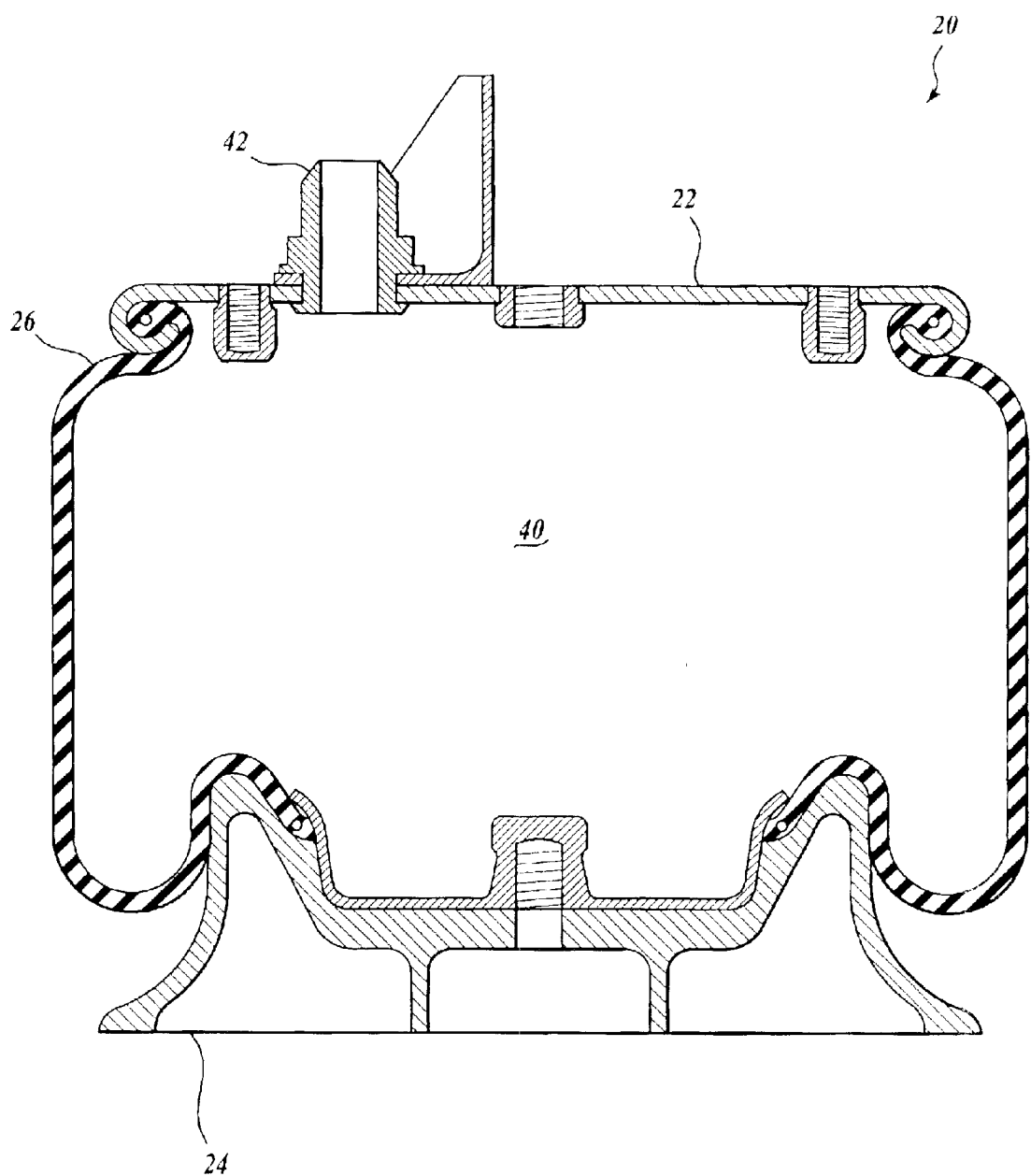
FIG. 1 is a cross sectional view of one air spring suitable for incorporating a heat sink in accordance with the present invention.

The present invention will now be described with reference to the accompanying drawings where like numerals correspond to like elements. The present invention is directed to a method and apparatus for reducing the spring rate of an air spring by providing a heat sink within the working chamber of the air spring. Generally described, the heat sink, in effect, reduces the ratio of specific heats, gamma, of the spring medium, e.g. air, located within the air spring, which in turn, reduces the spring rate.

While the present invention was developed to reduce the spring rate of an air spring used by a suspension system of a motor vehicle, such as heavy trucks, it is to be understood that the invention can be used in other apparatuses requiring or desiring a spring rate reduction mechanism. Thus, the following description relating to motor vehicle suspension air springs is meant to be illustrative and not limiting to the broadest scope of the invention, as claimed. Additionally, while the term air spring is used throughout the specification, it is meant to refer only to a structure capable of absorbing energy between two spaced-apart members, and not to the particular type of gaseous medium used therein. Accordingly, it will be appreciated that any gas, such as nitrogen, helium, butane, or air, to name a few, can be practiced by the air spring described herein.

Prior to describing an exemplary embodiment of a heat sink for reducing the spring rate of an air spring, a brief discussion of the nature and operation of one type of air spring suitable for incorporating the present invention is set forth. In this regard, attention is directed to FIG. 1, which illustrates selected components of a motor vehicle air spring 20. Generally described, the air spring 20 includes a top plate 22, a piston 24, and a flexible bladder 26. The top plate 22 is adapted to be mounted to a first support structure (not shown), such as a chassis frame member of the vehicle. Spaced apart from the top plate is the piston 24, which is adapted to be mounted on a second support plate (not shown) that is movable relative to the first support structure. The second support plate can be mounted on the end of a trailing arm, axle plate or similar portion of the vehicle, or any spaced support structure of a piece of equipment with which the air spring 20 can be used.

In a preferred embodiment, the air spring 20 is part of a suspension system (not shown) for a heavy truck having a operational frequency of greater than 1 Hz, and possibly as high as 10–12 Hz. In the preferred embodiment, the top plate 22 bolts to or otherwise fastens to the chassis member of the heavy truck. Vehicle axles are positioned transverse to and rotatably mounted below the chassis members. An axle plate, which is supported by the axle, is disposed a spaced distance below the chassis member. The axle plate includes holes for coupling the piston 24 to the axle plate. Thus, the air spring 20 acts to cushion movement between the axles and the chassis member of the motor vehicle.

Still referring to FIG. 1, the flexible bladder 26 is disposed between the top plate 22 and the piston 24. The ends of the flexible bladder 26 are coupled to the top plate 22 and the piston 24 in an airtight manner. The flexible bladder 26 is preferably formed by a cylindrical tubular shaped sleeve, which is formed to an appropriate length from any suitable elastomeric or polymeric material. The opposite edges of the flexible bladder 26 may be formed with beads that define upper and lower openings as shown. The top plate 22 and piston 24 are connected to the opposite edges of the flexible bladder 26 that form the upper opening and lower opening, respectfully, in an air-tight manner, such as by bead clamping or other conventional means. Once sealed, the enclosed inner cavity of the flexible bladder 26 forms a working chamber 40. The top plate 22 includes a connection port 42 that is connected in fluid communication with the working chamber 40, and is adapted to be connected to a source of pressurized gas, such as air, nitrogen, helium, butane, to name a few. The gas contained within the working chamber 40 is typically referred to as the spring medium. The air spring illustrated in FIG. 1 and described above is commercially sold by Bridgestone/Firestone as Model 1T15T-1, and thus will not be described in any greater detail.

In operation, the piston 24 moves axially toward and away from the top plate 22 so as to alternatingly compress and expand the working chamber 40 of the air spring 20. When the piston 24 travels from an at-rest position (i.e. expanded) to a compressed position (i.e. moves through one full stroke) and returns to the at-rest position, one cycle of the air spring 20 is completed (also referred to as the compression/expansion cycle). The rate at which the air spring 20 is compressed and expanded through one complete cycle is referred to as the operational frequency (Hz) of the air spring. As the air spring 20 compresses, the ability of the air spring to compress is effected by its spring rate. As is known in the art, the spring rate is an indicator of its operational characteristics, for example, the stiffness of the air spring. The spring rate k may be determined by the following known equation (1).

$$k = ((n^* Pa^* (Ae)^2)/V) + (Pg^* (dAe/dx)); \text{ where} \quad (1)$$

n=gas constant;
Pa=absolute pressure;
Ae=effective area;
V=internal volume,
Pg=gage pressure;
x=height of air spring
dAe/dx=effective area rate of change.

At small deflections (i.e. total piston travel of approximately 1.0 inch through one complete cycle), and constant cross-sectional area, dAe/dx is approximately zero. Therefore, equation (1) reduces to equation (2).

$$k = (n^* Pa^* (Ae)^2)/V \quad (2)$$

Typically, n approaches 1.0 when sufficient heat exchange between the spring medium and its environment is present. This is generally known as an isothermal cycle and usually occurs at low operational frequencies of the air spring (i.e. a slow rate (Hz) of the compression/expansion cycle). As the operational frequency of the air spring increases to high operational frequencies, the spring medium begins to lack enough time for sufficient heat exchange with its environment, and thus, the cycle becomes adiabatic. In an adiabatic cycle, the gas constant (n) is expressed as gamma, which is 1.40 for air. Since the heat exchange characteristics are a function of the geometric configuration of the top plate, piston, and flexible bladder, there is not a definite demarcation that can be shown as the frequency division between an isothermal cycle, where n=1.0, and an adiabatic cycle, where n=gamma. According to the inventor of the present invention, when using the air spring 20 at typical operating pressures and target load capacities, low frequencies can be assumed to be below approximately 1 Hz, while high frequencies are approximately between 1–15 Hz. Thus, when air is used as the spring medium, the gas constant (n) fluctuates between a range of 1.0 and gamma, or 1.40, depending on the air spring's operational frequency.

Figure 2:
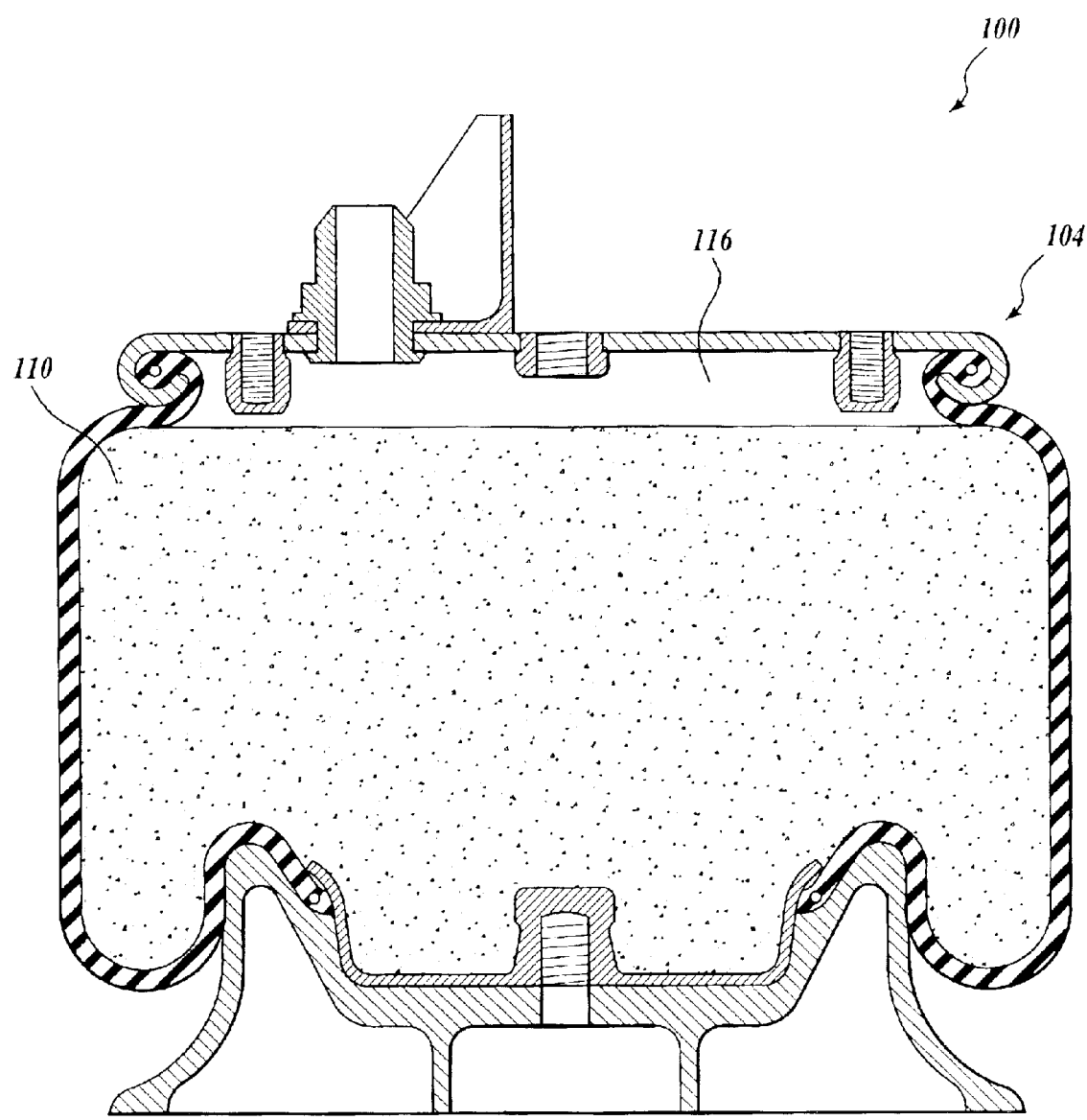
FIG. 2 is a cross sectional view of a combination air spring heat sink constructed in accordance with the present invention.

As previously noted, the present invention is directed to a heat sink incorporated within an air spring of the type illustrated in FIG. 1, and briefly described above, for reducing the spring rate of the air spring. An exemplary embodiment of a heat sink incorporated into the air spring of FIG. 1 is illustrated in FIG. 2 and generally designated 100. The combination heat sink air spring 100 comprises an air spring 104, identical in construction and operation as air spring 20, and a heat sink 110. The heat sink 110 is disposed within the working chamber 116 defined by the air spring 104, and is preferably a composition or agglomeration of a pre-selected quantity of material that may be uniformly distributed therein. It will be appreciated that the composition may be homogenous (i.e. made up of one type of material) or heterogeneous (i.e. made up of more than one type of material). When incorporated into the working chamber 116 of the air spring 104, the heat sink 110 reduces the spring rate of the air spring 104, as will be discussed in more detail below. As such, the reduction of the spring rate of the air spring provides improved vibration isolation, occupant ride quality, and cargo protection.

Suitable materials for the composition of the heat sink 110 of the present invention will now be described. The materials used to form the heat sink 110 may be selected for at least any combination of, and preferably all of the following desired characteristics: 1) the thermal capacity of the material should be as large as possible as compared to the thermal capacity of the pressurized spring medium; 2) the exposed surface area to mass ratio of the material should be as high as possible, so that the heat transfer between the spring medium and the heat sink is rapid as compared to the operational frequency of the air spring; 3) the material also should preferably have the ability to be uniformly distributed throughout the internal volume and should preferably resist matting or clumping.

Figure 3:
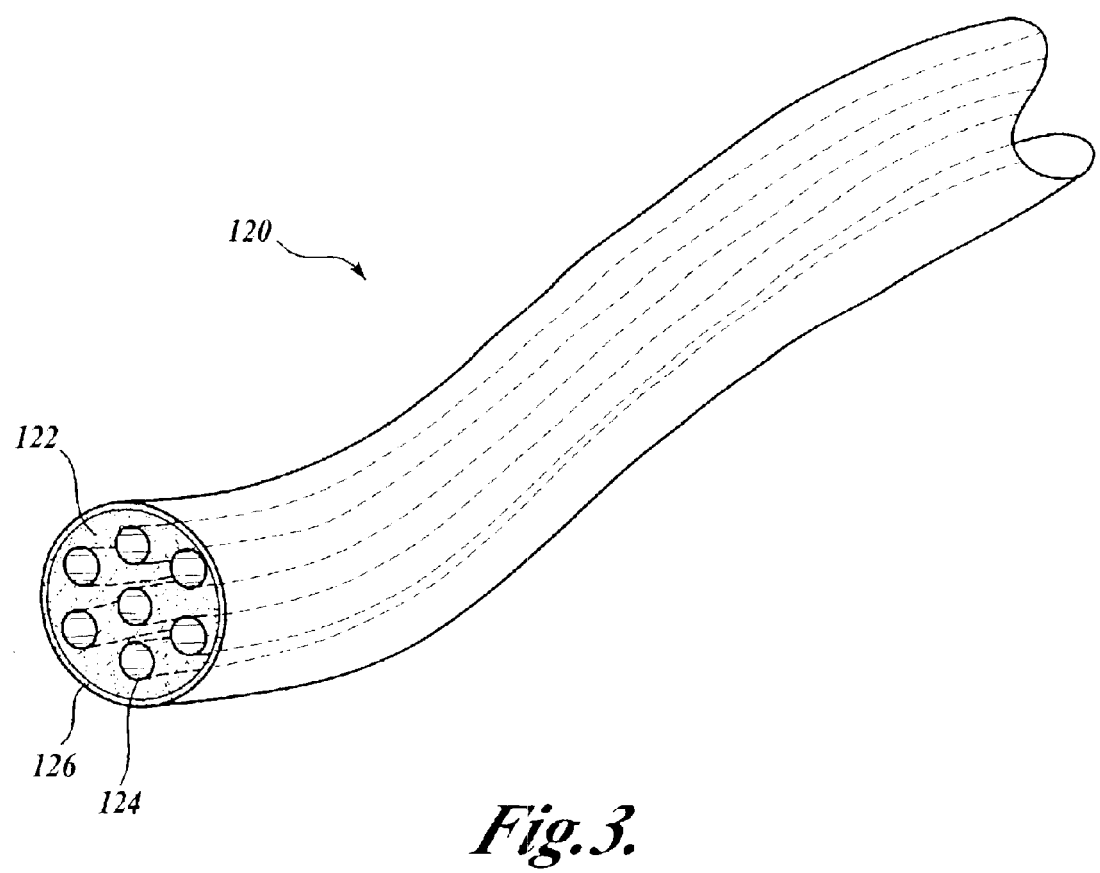
FIG. 3 is a perspective view of a fiber that may be utilized as the heat sink shown in FIG. 2.

One exemplary embodiment of the heat sink 110 in accordance with aspects of the present invention is a plurality of polymeric or elastomeric fibers configured as a stable fiber, commonly referred to as "fiberfill." As used herein, the term "fiber" is used to mean both fiber and fiberfill. One such polymeric fiber found to have the aforementioned characteristics is a polyester fiber 120 commercially sold by DuPont® under the tradename Quallofil® 7, shown best in FIG. 3. FIG. 3 is a perspective view of a single fiber 120. Briefly described, the fiber 120 includes a body 122 having a plurality of bores 124 which extend along the length of the fiber 120 and opens at opposite ends of the body 122. The fiber 120 is coated with a layer 126 of friction reducing material, such as polytetrafluoroethylene (PTFE) or silicone slickeners, for example, polysiloxane, to improve its lubricity so as to reduce surface friction between two or more fibers 120, which in turn, resists matting and provides airiness to the composition fibers. One type of silicone slickener that may be practiced with the present invention is described in U.S. Pat. No. 3,454,422, which is expressly incorporated by reference. However, it will be apparent that fibers without a friction reducing coating may be used, or that a combination of coated and non-coated fibers may be used.

Other materials found to be suitable for the heat sink 110 include, but are not limited to, polyethylene terephthalate (PET) fiber, and other polyester fibers sold under the names Dacron®, Hollofil®, and Quallofil®, to name a few. Blended fibers, bicomponent fibers, also known as conjugate fibers, and copolymer fibers are also contemplated to be practiced with the present invention. The term "bicomponent fiber" is used herein to refer to a fiber made up of two different polymer types, or the same polymer with two different viscosity levels. Thus, it will be appreciated that the heat sink of the present invention may be composed of a variety of materials having at least one, a combination of, and/or preferably, all the aforementioned characteristics. Accordingly, any material having at least one of these characteristics are contemplated to be within the scope of the present invention.

The exemplary embodiment of the combination air spring heat sink 100 illustrated in FIG. 2 reduces the spring rate of the air spring as follows. As is known in the art, during the compression-expansion cycle for a typical air spring, there is in effect no net heat transfer between the spring and its environment. This can be referred to as an adiabatic cycle. During an adiabatic cycle of a conventional air spring, the spring medium, e.g. air, is heated as the air spring compresses, and is cooled as the air spring expands. However, with the addition of the heat sink 110 as proposed by the present invention, heat from the spring medium, e.g. air, is absorbed by the heat sink 110 during the compression stroke, then transferred back to the spring medium as the air spring expands. This occurs rapidly on a molecular level. As such, the addition of the heat sink 110 results in a compression-expansion cycle that approaches a constant temperature or isothermal cycle. The net result is a reduction in the spring rate since the spring rate of an air spring operating in an adiabatic process is approximately 40% higher than an air spring operating in an isothermal process when air is used as the spring medium. Thus, the closer the compression-expansion cycle approaches a pure isothermal process, the lower the spring rate of the air spring becomes.

A number of industrial scale experiments were preformed under properly controlled conditions to investigate the reduction in spring rate achieved from actual embodiments of the present invention. These experiments and the results therefrom will now be described in detail.

EXAMPLE 1

A number of air springs incorporating a heat sink according to an actual embodiment of the present invention were tested to determine the reduction in spring rate of the air springs due to the presence of a heat sink. Three model number 1T15T-1 air springs commercially available by Bridgestone/Firestone were used in the experiment to determine the suitability of the heat sink to reduce the spring rate of the air springs. The test parameters for the air springs were as follows: Operational frequency—1 Hz; Air pressure—100 psig.; and Stroke amplitude—±0.5 inches (i.e. 1 inch total travel through complete cycle) and ±1.0 inches (i.e. 2 inch total travel through complete cycle).

Each air spring was tested without the heat sink and the results were recorded to establish a base line or reference point for analyzing the results. The heat sink was then added to each air spring in eight mass increments of 50 grams. After each addition of heat sink material, the tests were repeated and the results were recorded.

In accordance with this embodiment of the present invention, tests on a heat sink composed of PET fibers were conducted according to the parameters and test procedures stated above. The PET fiber tested was six (6) denier, type 67, 2 inch crimped with 18–20% void in the fiber, and a diameter of approximately 30 microns. The PET fiber was added in eight increments of 50 grams each. The results (i.e. base line and quantity of material) of the PET fiber as the heat sink are summarized in Tables 1–3 below.

TABLE 1

| Air spring #1 | Rate (lbs./in) @ ±0.5 Stroke length | Rate (lbs./in) @ ±1.0 Stroke length |
|---|---|---|
| Baseline | 2275 | 2358 |
| 50 grams of fiber | 2118 | 2184 |
| 100 grams of fiber | 2039 | 2116 |
| 150 grams of fiber | 1995 | 2076 |
| 200 grams of fiber | 1966 | 2056 |
| 250 grams of fiber | 1966 | 2066 |
| 300 grams of fiber | 1990 | 2086 |
| 350 grams of fiber | 2010 | 2112 |
| 400 grams of fiber | 2029 | 2140 |

TABLE 2

| Air spring #2 | Rate (lbs./in) @ ±0.5 Stroke length | Rate (lbs./in) @ ±1.0 Stroke length |
|---|---|---|
| Baseline | 2216 | 2314 |
| 50 grams of fiber | 2069 | 2162 |
| 100 grams of fiber | 2029 | 2105 |
| 150 grams of fiber | 1971 | 2066 |
| 200 grams of fiber | 1956 | 2051 |
| 250 grams of fiber | 1941 | 2047 |
| 300 grams of fiber | 1956 | 2061 |
| 350 grams of fiber | 1971 | 2076 |
| 400 grams of fiber | 1980 | 2100 |

TABLE 3

| Air spring #3 | Rate (lbs./in) @ ±0.5 Stroke length | Rate (lbs./in) @ ±1.0 Stroke length |
|---|---|---|
| Baseline | 2225 | 2321 |
| 50 grams of fiber | 2073 | 2159 |
| 100 grams of fiber | 1985 | 2083 |
| 150 grams of fiber | 1946 | 2039 |
| 200 grams of fiber | 1936 | 2037 |

TABLE 3-continued

| Air spring #3 | Rate (lbs./in) @ ±0.5 Stroke length | Rate (lbs./in) @ ±1.0 Stroke length |
|---|---|---|
| 250 grams of fiber | 1936 | 2039 |
| 300 grams of fiber | 1936 | 2049 |
| 350 grams of fiber | 1966 | 2081 |
| 400 grams of fiber | 1985 | 2108 |

EXAMPLE 2

An air spring incorporating a heat sink according to another actual embodiment of the present invention was tested to determine the reduction in spring rate of the air spring due to the presence of the heat sink. Again, a single model number 1T15T-1 air spring commercially available by Bridgestone/Firestone was use in the experiment to determine the suitability of the heat sink to reduce the spring rate of the air spring. The test parameters for the air spring were as follows: Operational frequency—variable between 0.1 Hz–15 Hz; Air pressure—65 psi (4000 lb.); and Stroke amplitude—±0.5 inches (i.e. 1 inch total travel through complete cycle). The heat sink was then added into the air spring in five mass increments of 0.1 pounds (lbs.). After each addition of material, the test was repeated and the results were recorded. The air spring absent the heat sink was also tested to establish a base line or reference point for analyzing the results.

According to this embodiment of the present invention, a polyester fiber sold by DuPont® under the tradename Quallofil® 7 was used as the heat sink and was disposed within the working chamber of the air spring for testing. The polyester was approximately six (6) denier and 2 inches in length, and included a friction reducing coating. The results of the Quallofil® 7 as a heat sink are summarized in Table 4 below.

TABLE 4

Pneumatic Spring Rate (K)
W/Quallofil ® 7 (Q7) as the Heat Sink
1" Total Stroke @ 65 psi (4000 lb.)

65 psi (4000 lb.) preload; 1" total stroke; Quallofil-7 (Q7)

| Frequency | Baseline K - lb./in | 0.1 lb. Q7 K - lb./in | 0.2 lb. Q7 K - lb./in | 0.3 lb. Q7 K - lb./in | 0.4 LB Q7 K - lb./in | 0.5 LB Q7 K - lb./in |
|---|---|---|---|---|---|---|
| 0.1 | 1412 | 1244 | 1200 | 1192 | 1195 | 1204 |
| 0.25 | 1421 | 1255 | 1208 | 1189 | 1211 | 1193 |
| 0.5 | 1431 | 1269 | 1206 | 1196 | 1206 | 1214 |
| 1 | 1441 | 1270 | 1223 | 1204 | 1213 | 1204 |
| 2 | 1441 | 1279 | 1223 | 1210 | 1212 | 1213 |
| 3 | 1449 | 1287 | 1234 | 1218 | 1218 | 1214 |
| 4 | 1442 | 1292 | 1230 | 1214 | 1233 | 1230 |
| 5 | 1450 | 1296 | 1234 | 1217 | 1224 | 1224 |
| 6 | 1456 | 1302 | 1247 | 1230 | 1229 | 1228 |
| 7 | 1451 | 1294 | 1256 | 1239 | 1242 | 1223 |
| 8 | 1456 | 1312 | 1260 | 1243 | 1233 | 1239 |
| 9 | 1455 | 1303 | 1259 | 1240 | 1229 | 1223 |
| 10 | 1464 | 1318 | 1266 | 1245 | 1250 | 1244 |
| 11 | 1464 | 1320 | 1252 | 1233 | 1251 | 1237 |
| 12 | 1472 | 1327 | 1270 | 1257 | 1238 | 1243 |
| 13 | 1469 | 1320 | 1276 | 1258 | 1249 | 1254 |
| 14 | 1467 | 1319 | 1265 | 1251 | 1247 | 1242 |
| 15 | 1478 | 1353 | 1292 | 1273 | 1276 | 1266 |

While the embodiments of the invention has been illustrated and described, it will be appreciated that various changes can be made therein without departing from the spirit and scope of the invention, as claimed. For example, while an exemplary embodiment of the heat sink fiber was shown having an annular cross-section, the heat sink fiber may have other cross-sectional shapes. Additionally, the heat sink fiber is shown having seven bores; however, any number of bores may be used, including a heat sink fiber absent a bore.

What is claimed is:

1. An air spring of a vehicle suspension operating at frequencies greater than 1 hertz, comprising:

first and second end members adapted to be mounted at spaced apart locations; a flexible sleeve having first and second open ends sealingly engaged with the first and second end members, respectively, thereby forming a main chamber within the sleeve for containing a pressurized gas; and a heat sink occupying a portion of the main chamber, the heat sink comprising a plurality of polymeric fibers, wherein at least one of the polymeric fiber includes a longitudinally extending core having a plurality of bores disposed along the longitudinal axis of the core and opening at opposite ends thereof, the heat sink being configured to transfer heat between the pressurized gas and the heat sink when the air spring is operated at frequencies greater than 1 Hz, thereby reducing the spring rate of the air spring.

2. The air spring of claim 1, wherein a portion of the core is surrounded by a friction reducing coating.

3. The air spring of claim 2, wherein the friction reducing coating is polysiloxane or polytetrafluoroethylene.

4. The air spring of claim 1, wherein the polymeric fibers are selected from a group consisting of homogenous fibers, blended fibers, bicomponent fibers, and copolymer fibers.

5. An air spring of a vehicle suspension operating at frequencies greater than 1 hertz, comprising:

first and second end members adapted to be mounted at spaced apart locations; a flexible sleeve having first and second open ends sealingly engaged with the first and second end members, respectively, thereby forming a main chamber within the sleeve for containing a pressurized gas; and a heat sink occupying a portion of the main chamber, wherein the heat sink is configured to transfer heat between the pressurized gas and the heat sink when the air spring is operated at frequencies greater than 1 Hz, thereby reducing the spring rate of the air spring, wherein the heat sink is comprised of a first and a second fiberfill, the first fiberfill being formed from a material different than the second fiberfill.

6. The air spring of claim 1, wherein the heat sink is uniformly distributed within the main chamber.

7. A method for reducing the spring rate of an air spring having an operational frequency greater than 1 hertz, comprising:

obtaining an air spring defining a working chamber for containing a pressurized gaseous medium; and disposing a heat sink within the working chamber of the air spring, the heat sink being comprised of a plurality of polymeric fibers, wherein at least one of the polymeric fibers includes a longitudinally extending core having a plurality of bores disposed along the longitudinal axis of the core and opening at opposite ends thereof, the heat sink being operable to exchange heat between the spring medium of the air spring and the heat sink when the air spring is operated at frequencies greater than 1 Hz.

8. The method of claim 7, wherein disposing a heat sink within the working chamber includes disposing the heat sink uniformly within the working chamber.

9. The method of claim 7, wherein portion of the core is surrounded by a friction reducing coating.

10. The method of claim 7, wherein the plurality of polymeric fibers is configured as polyester fiberfill.

11. The method of claim 7, wherein the polymeric fibers are selected from a group consisting of homogenous fibers, blended fibers, bicomponent fibers, and copolymer fibers.

12. A method for reducing the spring rate of an air spring having an operational frequency greater than 1 hertz, comprising:

obtaining an air spring defining a working chamber for containing a pressurized gaseous medium; and disposing a heat sink within the working chamber of the air sprint, the heat sink operable to exchange heat between the spring medium of the air spring and the heat sink when the air spring is operated at frequencies greater than 1 Hz, wherein the heat sink is composed of a first and a second fiberfill, the first fiberfill being formed from a material different an the second fiberfill.

13. A method of using an air spring having a working chamber occupied by a spring medium, comprising:

disposing a heat sink within the working chamber of the air spring, the heat sink being comprised of a plurality of fibers, wherein at least one of the fibers includes a longitudinally extending core having at least one bore disposed along the longitudinal axis of the core and opening at opposite ends thereof, the heat sink being operable to transfer heat to and receive heat from the spring medium of the air spring;

operating the air spring at frequencies greater than 1 hertz by alternatingly compressing and expanding the air spring; and reducing the spring rate of the air spring by the heat transfer between the spring medium and the heat sink during the compression and expansion of the air spring.

14. An air spring, comprising:

first and second end members adapted to be mounted at spaced apart locations;

a flexible sleeve having first and second open ends sealingly engaged with the first and second end members, respectively, thereby forming a main chamber within the sleeve for containing a pressurized gas; and a heat sink occupying a portion of the main chamber, the heat sink comprising a plurality of fibers, wherein at least one of the fibers includes a longitudinally extending core having at least one bore disposed along the longitudinal axis of the core and opening opposite ends thereof, the heat sink being operable to exchange heat between the pressurized gas and the heat sink.

15. A method for reducing the spring rate of an air spring, comprising:

obtaining an air spring defining a working chamber for containing a pressurized gaseous medium; and disposing a heat sink within the working chamber of the air spring, the heat sink comprising a plurality of fibers, wherein at least one of the polymeric fibers includes a longitudinally extending core having at least one bore disposed along the longitudinal axis of the core and opening at opposite ends thereof, the heat sink being operable to exchange heat between the spring medium of the air spring and the heat sink.

\* \* \* \* \*

UNITED STATES PATENT AND TRADEMARK OFFICE
CERTIFICATE OF CORRECTION

PATENT NO. : 6,851,665 B2
DATED : February 8, 2005
INVENTOR(S) : P.M. McLaughlin It is certified that error appears in the above-identified patent and that said Letters Patent is hereby corrected as shown below:

Title page,
Item [56], References Cited, OTHER PUBLICATIONS, delete
"Low Gamma Gas, Heat Sink, and Pneumatic Damping," *SAE HS-1576 Pneumatic Spring Manual*, 1988, Chap. 5pp. 4.24-4.27." (duplicate).

Column 9,
Line 59, "wherein portion" should read -- wherein a portion --.

Column 10,
Line 11, "air sprint," should read -- air spring, --.
Line 16, "different an" should read -- different than --.
Line 46, "opening opposite" should read -- opening at opposite --.

Signed and Sealed this

Twenty-eighth Day of March, 2006

JON W. DUDAS
*Director of the United States Patent and Trademark Office*